UNITED STATES PATENT OFFICE.

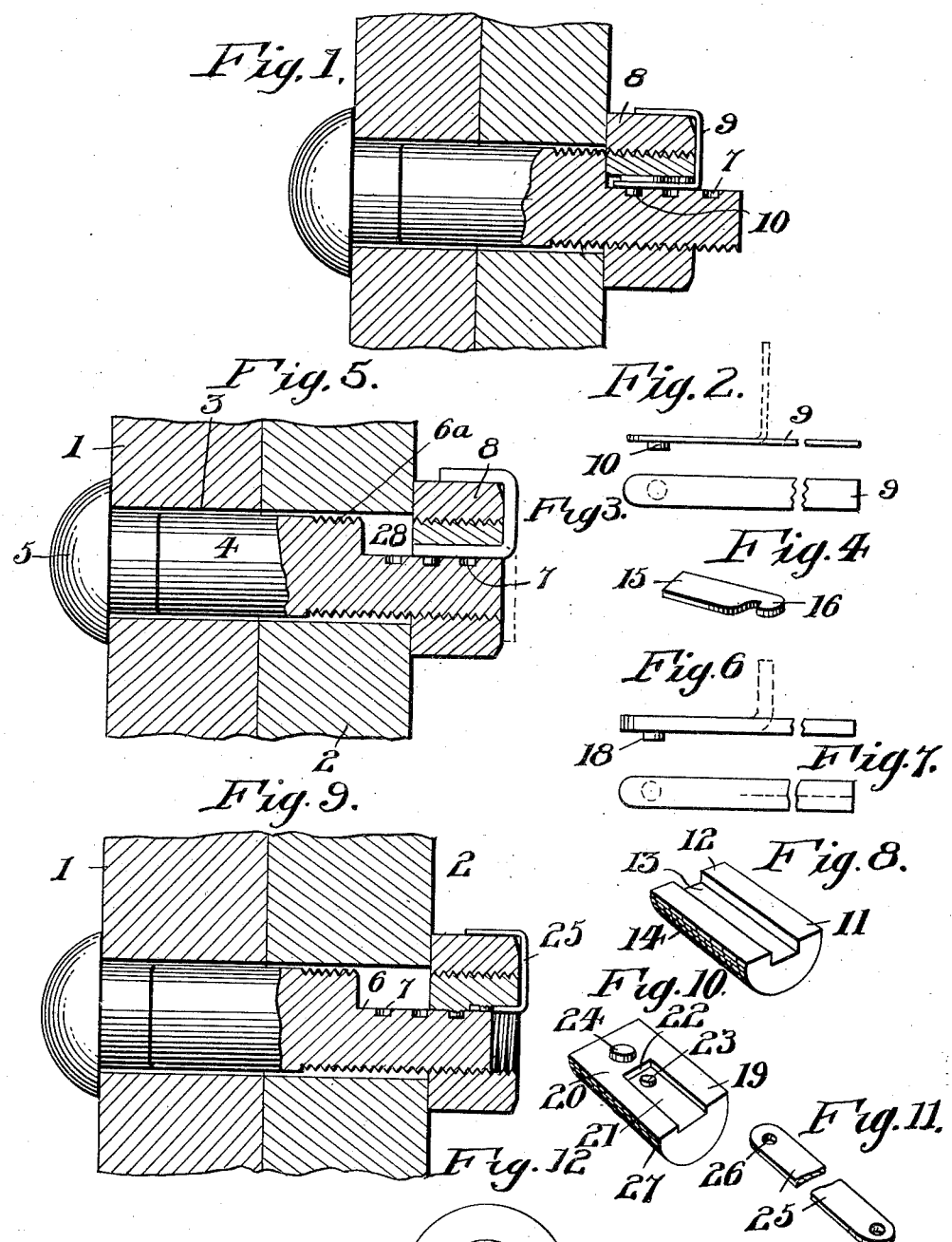

GEORGE E. L. SEMANS, OF PITTSBURGH, PENNSYLVANIA.

NUT-LOCK.

1,034,312.  Specification of Letters Patent.  Patented July 30, 1912.

Application filed August 18, 1911. Serial No. 644,750.

*To all whom it may concern:*

Be it known that I, GEORGE E. L. SEMANS, a citizen of the United States of America, residing at Pittsburgh, in the county of Allegheny and State of Pennsylvania, have invented certain new and useful Improvements in Nut-Locks, of which the following is a specification, reference being had therein to the accompanying drawing.

This invention relates to improvements in nut locks and has for its object to provide a device of this character which will, when the nut is threaded to position, prevent back rotation of the nut upon the bolt, thereby reducing liability to loosen the elements through which the bolt extends to a minimum.

Other objects of the invention are to provide a structure employing a bendable strip which acts to form the nut retaining means and which is so located and held in position as to prevent its being brought into contact with the threads of either bolt or nut.

Further objects of the invention are to provide a nut lock which is comparatively simple in its construction and arrangement, strong, durable, efficient and convenient in its use, readily set up with respect to the elements which are to be clamped together and inexpensive to manufacture.

With the foregoing and other objects in view, the invention consists of a novel construction, combination and arrangement of parts as hereinafter more specifically described and illustrated in the accompanying drawings, but it is to be understood that changes, variations and modifications can be resorted to, which fall within the scope of the claims herein appended.

In the drawings wherein like reference characters denote corresponding parts throughout the several views, Figure 1 is an elevation, partly in longitudinal section, of a nut lock in accordance with this invention, showing the adaptation thereof in connection with a pair of bars which are clamped together by a nut lock. Fig. 2 is a side view of the bendable retaining member for the nut, and further showing in dotted lines a portion of the member bent, the member being broken away. Fig. 3 is a top plan view, broken away of the nut retaining member. Fig. 4 is a perspective view of a clamping member for the nut retaining member. Fig. 5 is a view similar to Fig. 1 of a modified form. Fig. 6 is a view similar to Fig. 2 of a modified form of bendable nut retaining member. Fig. 7 is a top plan view of the form of nut retaining member shown in Fig. 6. Fig. 8 is an inverted perspective view of the peripherally threaded segment shaped holding member employed in either of the constructions shown in Figs. 1 and 5 to provide a continuation of the threads of the bolt. Fig. 9 is a view similar to Fig. 1 of another modification. Fig. 10 is an inverted perspective view of a modified form of segment shaped holding member used in connection with the construction shown in Fig. 9. Fig. 11 is a perspective view of a modified form of nut retaining member used in connection with the construction shown in Fig. 9, and Fig. 12 is an end view of the bolt.

Referring to the drawings in detail there is illustrated in Figs. 1, 5, and 9, by way of example, a pair of bars 1, 2, which are adapted to be clamped together and retained in clamped position through the medium of the construction hereinafter referred to. Each of the bars 1, 2 is provided with an opening 3, the opening of one bar registering with the opening of the other bar and through said openings is adapted to extend the shank 4 of the bolt which forms an element of the nut lock.

As the bolt shown in Figs. 1, 5, 9 and 12 is of the same construction it will be described from a general standpoint, so that the following description of the bolt will apply to the bolt shown in each of the Figs. 1, 3, 9 and 12. The shank 4, of the bolt at one end is provided with a head 5, adapted when the bolt is set up in operative position to engage the outer face of the bar 1. The shank 4 is provided with a threaded protion 6ª, the latter being cut away for a portion of its length to provide a substantially flat face 6, intersecting the threads of the shank and extending longitudinally from that end of the shank opposite the end provided with the head 5. The flat face 6 is provided with sockets 7, as shown three in number, but the number of the sockets 7 can be increased or diminished, if desired and the function of said sockets will be hereinafter referred to. The nut, indicated at 8, is of any usual and well known construction, being threaded to run on the bolt 4.

Referring to Figs. 1 to 4 and 8 of the drawings a bendable nut retaining member is employed and it consists of a relatively thin strip of malleable metal having its inner end provided with a lug 10 adapted to engage in one of the sockets 7, the lug 10 being of the same shape as the sockets and of such size as to snugly fit the same when positioned therein. The member 9 is mounted upon the flat face 6 and is adapted to be bent around the outer face of and engage any one of the sides of the nut 8, thereby preventing back rotation of the nut. Mounted upon the flat face 6, of the bolt is a segment shaped holding member 11, having its flat face 12, formed with a longitudinal groove 13. The member 11 is also provided with peripheral threads 14, these latter forming a continuation of the threads of the bolt. The member 11 corresponds in length to the axial length of the nut, and when in proper position, the inner and outer ends of the holding member 11 will lie substantially flush with the similar ends of the nut, as shown, irrespective of the particular position which the nut may occupy with respect to the threads of the bolt, this being clearly shown in the three Figs. 1, 5 and 9.

The bendable strip or retaining member 9 shown in Figs. 1 to 8 inclusive rests within the groove 13 of the holding member 11, with its lug 10 positioned in either of the sockets 7, this member being of a cross sectional area corresponding to the similar area of the groove 13 as shown in Figs. 5, 6 and 7, or of less area than said groove as shown in Figs. 1 to 4, the structure of Fig. 5 requiring the retaining member to be positioned prior to the positioning of the holding member 11, the latter being placed with its inner end approximately on the line corresponding to the face against which the nut is to abut, the slight variation which may be required being due to the necessity for slightly shifting the member 11 longitudinally to cause its threads to properly aline with threads of the bolt. The nut is then run onto the bolt and the member 11 and carried into contact with the member 2, after which the retaining member is bent radially of the nut and onto one of the faces. Where the member 9 is of less cross sectional area than the similar area of the groove as shown in Fig. 1, I preferably employ a clamping member 15, the combined cross sectional area of the retaining member and the clamping member substantially equaling that of the groove, the clamping member being provided with a hook 16 which enables it to be withdrawn by the insertion of a suitable tool, when the member 9 is straightened out, said member 9, when bent to the position shown in Fig. 1, securing the member 15 against withdrawal movement. With this particular form, the retaining member can be changed at will without removing the nut, since a removal of the member 15 will permit the lug 10 to be disengaged and enable the member 9 to be withdrawn.

As will be readily seen, with either of the forms thus described, or the form presently described, the retaining member is spaced from the threads of both bolt and nut, the member 11 preventing any contact of the member 9 and the threads, thereby making it impossible for the threads to be affected by the holding member either accidentally or in an attempt to withdraw the locking device by the use of an instrument for the purpose of disengaging the lug 10 from a socket. Consequently the nut and bolt can be used for any length of time, the only portion which requires renewing under changed conditions being the retaining member 9. Since the member 11 is in threaded engagement with the nut, this member cannot be moved to permit the member 9 to be manipulated, and since there is no requirement for a special form of nut, and the formation of the flat face 6 is provided by a removal of a portion of the bolt on a line corresponding to the chord of a circle on a cross section of a threaded portion of the bolt, it will be readily understood that such changes as are required from the ordinary bolt and nut structure are such as can be provided at little cost.

In the form of retaining member shown in Figs. 5 to 7, the holding lug is indicated at 18, and in this form the member may be split longitudinally as shown in dotted lines in Fig. 7 so as to provide for a bending thereof in opposite directions as indicated in Fig. 5.

When the retaining member is in position to prevent rotation of the nut, it not only engages the outer face of the nut 8 but also the outer end of the holding member 11.

In the construction shown in Figs. 9 to 11, the holding member indicated as 19 differs somewhat in its flat face configuration from the member 11, in that the groove, indicated at 21 extends but partially of the length of the member and is provided with a lug 23, the flat face 20 of the member being provided with a lug 24 in rear of the groove. The retaining member in this form is provided with an opening 26 by means of which the strip, indicated at 25 is secured against longitudinal movement in the groove. The strip is shown as provided with an opening at each end thus enabling either end to be employed. In this form the holding member itself is locked to the bolt and the strip is locked to the holding member thus providing for retaining the member 25 against withdrawal and at the same time preventing manipulation which would permit of the removal of the strip in a manner to damage the threads of the bolt and nut, the member 19 being threaded, as at 27 similar to the threading of the member 11.

By the use of a plurality of sockets 7, reasonable surety will be had that the engaging lug 10 or 18 as the case may be will be positioned at some point within the planes of the ends of the holding member, the holding member acting to positively retain the lug in the proper socket regardless of the position of the member on the bolt. And in the form shown in Figs. 9 to 11, this provision of the sockets enables the holding member to be held in position with different thicknesses of material which is being held by the bolt and nut.

What I claim is:

1. In a nut lock, a bolt having a substantially flat face intersecting the threads of the bolt and extending longitudinally from the end opposite the head, said face corresponding to the chord of a circle on a cross section of the threaded portion of the bolt, a holding member removable from and seated on said face and having a cross sectional configuration to substantially complete one or more of the threads of the bolt when in position, and means interposed and normally held between the opposing surfaces provided by said face and member and projecting beyond the outer end of said member for retaining said nut in position.

2. In a nut lock a bolt having a substantially flat face intersecting the threads of the bolt and extending longitudinally from the end opposite the head, said face corresponding to the chord of a circle on a cross section of the threaded portion of the bolt, a member removable from and seated on the said face and having a cross sectional configuration to substantially complete one or more of the threads of the bolt when in position, a nut adapted to thread on said bolt and member, said member substantially corresponding in length to the axial length of the threaded interior of the nut, and means interposed and normally held between the opposing surfaces provided by said face and member and projecting beyond the outer end of said member for retaining said nut in position.

3. A nut lock comprising a bolt having its threaded portion cut away to provide a flat face, a holding member mounted upon the flattened portion of the bolt and threaded to form a continuation of threads of the bolt, a nut mounted upon said member, a retaining member extending between said holding member and said face and bent around the holding member and nut, and means to prevent longitudinal movement of the retaining member.

4. A nut lock consisting of a bolt having its threaded portion cut away to provide a flat face, a segment shaped holding member mounted upon said flat face and having its inner face formed with a groove and its outer face threaded to form a continuation of threads of the bolt, a nut mounted upon said member and bolt, a retaining member in said groove and further abutting against one end of said holding member, the outer face of the nut and engaging one side of the nut, and means to prevent longitudinal movement of said retaining member.

5. A nut lock comprising a bolt having its threaded portion cut away to provide a flat face, a threaded holding member mounted upon the flattened portion of the bolt and forming a continuation of threads of the bolt, the flat face of the bolt provided with a series of sockets, a retaining member interposed between said holding member and bolt and having means extending into one of said sockets thereby preventing longitudinal movement of the retaining member, said retaining member bent around the holding member and nut thereby preventing back rotation of the nut.

In testimony whereof I affix my signature in the presence of two witnesses.

GEORGE E. L. SEMANS.

Witnesses:
MAX H. SROLOVITZ,
KARL H. BUTLER.